(12) United States Patent
Watanabe et al.

(10) Patent No.: US 8,477,723 B2
(45) Date of Patent: Jul. 2, 2013

(54) IMAGE DISPLAY DEVICE AND WIRELESS COMMUNICATION SYSTEM

(75) Inventors: Takashi Watanabe, Osaka (JP); Toshihiro Ezaki, Osaka (JP); Yasuaki Sakanishi, Osaka (JP); Wataru Noguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 12/667,914

(22) PCT Filed: Mar. 12, 2008

(86) PCT No.: PCT/JP2008/000540
§ 371 (c)(1),
(2), (4) Date: Jan. 6, 2010

(87) PCT Pub. No.: WO2009/008109
PCT Pub. Date: Jan. 15, 2009

(65) Prior Publication Data
US 2010/0182977 A1    Jul. 22, 2010

(30) Foreign Application Priority Data
Jul. 10, 2007   (JP) .................................. 2007-180618

(51) Int. Cl.
*H04W 4/00*     (2009.01)
(52) U.S. Cl.
USPC .......................................... 370/331; 370/338
(58) Field of Classification Search
USPC ... 370/331, 328, 445; 455/442, 443; 345/156; 701/24, 49; 725/76; 340/974
See application file for complete search history.

(56) References Cited

U.S. PATENT DOCUMENTS

| | | | |
|---|---|---|---|
| 2005/0064870 A1* | 3/2005 | Gabara et al. | 455/438 |
| 2005/0132407 A1* | 6/2005 | Boyer et al. | 725/77 |
| 2006/0171348 A1* | 8/2006 | Nokano | 370/328 |

FOREIGN PATENT DOCUMENTS

| | | | |
|---|---|---|---|
| JP | 2002-236632 A | 8/2002 | |
| JP | 2004-289328 A | 10/2004 | |
| JP | 2005-323234 A | 11/2005 | |
| JP | 2006-033564 A | 2/2006 | |
| JP | 2006-506899 A | 2/2006 | |
| JP | 2006-101106 A | 4/2006 | |
| JP | 2006-121136 A | 5/2006 | |
| JP | 2006-262177 A | 9/2006 | |
| WO | WO 03032503 A2 * | 4/2003 | |

OTHER PUBLICATIONS

International Search Report for International Application No. PCT/JP2008/000540, Jun. 10, 2008, Panasonic Corporation.

* cited by examiner

*Primary Examiner* — Thai Nguyen
(74) *Attorney, Agent, or Firm* — RatnerPrestia

(57) ABSTRACT

The present invention includes a receiving antenna receiving information while changing plural different wireless base stations; a seat information acquiring unit acquiring position information of a destination seat paired; a wireless base station selecting unit selecting a wireless base station to be connected on the basis of position information; and a directivity switching unit changing directivity of the receiving antenna on the basis of position information, which transmits at least one of video information and audio information from a wireless base station to a user seated on the seat.

8 Claims, 14 Drawing Sheets

IMAGE DISPLAY DEVICE AND WIRELESS COMMUNICATION SYSTEM

This Application is a U.S. National Phase Application of PCT International Application PCT/JP2008/000540.

TECHNICAL FIELD

The present invention relates to an image display device usable in an aircraft, train, and the like, particularly to a wireless communication system with an image display device therein detached from a seat and usable while being carried.

BACKGROUND ART

In recent years, wireless communication systems represented by IEEE802.11a/b/g are achieving widespread use. These are called wireless LAN (local area network) systems, which are communication systems supporting a system equivalent to Ethernet (registered trademark) used in a wired LAN system.

A wireless LAN system at first was used such as for a portable or mobile personal computer and mobile wireless terminal. After that, it became used in various fields. For example, to eliminate complicatedness of wiring cables, a wireless LAN system is used for a terminal with its service space fixed. Conventionally, such application examples include a case where a wireless LAN system is used for distribution service of content such as audio and video in an aircraft (refer to literature 1 for example).

In this example, a wireless LAN system is incorporated in an aircraft; content data is sent out to a wireless terminal placed at each passenger seat, which implements information distribution service using a wireless LAN system.

The distribution system includes a server of the system for accumulating content data for presenting to passengers; and plural wireless access points (referred to as "access point" hereinafter), which are wireless base stations connected to the server, placed in the aircraft. Further, a wireless terminal is placed at each seat, and each access point is positioned so that one access point covers plural wireless terminals.

To position an access point, the cabin space is divided into plural small areas, and one access point is made correspond to one small area. Then, each access point is placed at an appropriate position and each channel is allocated so as to cover the entire service area of the cabin space.

To avoid interference between each wireless terminal, a directional antenna is arranged so as to radiate radio waves with a minimum of interference and disturbance made to a small area outside the own area. Then, setting is made so that wireless communications are performed with each wireless terminal inside the own area using a predetermined channel. Further, arrangement is made so that one access point communicates with each wireless terminal inside the small area where the access point is placed by time-dividing the frequency band of a channel used for wireless communications. This structure allows one channel to perform information distribution service individually for plural wireless terminals.

Conventionally, as a display means of the information distribution service, an image display device (abbreviated as "monitor" hereinafter) equipped on the back side of each seat is used.

In recent years, however, to enhance further convenience and comfort for passengers, a portable monitor (a monitor with wireless connection added) is receiving attention. When performing wireless communications in an aircraft by a conventional method, if a portable monitor moves beyond the cover area of an access point that has been used, the communication efficiency decreases and interference with other terminal devices occurs undesirably.

Conventionally, to present content such as audio and video (abbreviated as "AV information" hereinafter) in an aircraft, audio information is presented from the seat where the user is seated and video information is presented from the display device placed on the seat one row ahead of the seat where the user is seated. As the system configuration, an SEB (seat electronics box) for separating AV information received into audio and video information is arranged at each seat, and audio feedback method (seats adjacent to an SEB lengthwise are connected to each other using underfloor wiring) is used.

To receive AV information service with a portable monitor detached from the seat, however, audio feedback method cannot be used. Particularly, one to one relation between a monitor and a seat does not hold, and thus individual in-flight information service presented to each seat cannot be received by the monitor, or audio conforming to the video cannot be received at the own seat. Further, operation related to in-flight service (e.g. CA call (operation for calling a cabin attendant), lighting) is affected.

[Patent literature 1] Japanese Translation of PCT Publication No. 2006-506899

SUMMARY OF THE INVENTION

An image display device of the present invention includes a receiving antenna that receives information while changing plural different wireless base stations and that is movable between seats. The image display device is characterized in that it includes a seat information acquiring unit acquiring position information on a destination seat paired; a wireless base station selecting unit selecting a wireless base station to be connected based on the position information; and a directivity switching unit changing the directivity of the receiving antenna based on the position information.

Such a configuration allows a portable image display device to be used in an aircraft, and suppresses interference with other image display devices and degration in communication efficiency due to movement, thereby providing a high-quality mobile image display device for an aircraft.

The wireless communication system of the present invention is characterized in that it includes the above-described image display device and it transmits at least one type of information out of video and audio information to a user being seated from a wireless base station.

Such a configuration allows presenting at least one information service out of audio and video in an aircraft using a high-quality mobile image display device.

The wireless communication system of the present invention may include a path changing unit changing the reception path of audio information received from a wireless base station.

Such a configuration allows information presentation service to be performed by changing the reception path of audio information. Hence, the path can be changed in accordance with a user's usage environment to provide information service, thereby improving convenience.

A wireless communication system of the present invention, meanwhile, may have the following configuration. That is, a seat includes an audio output unit and has a wired transmission line connecting between the image display device and the audio output unit of a seat paired. The path changing unit changes the path so as to output audio information to the audio output unit through the wired transmission line.

Such a configuration implements audio feedback and provides high-quality audio service simply and reliably.

A wireless communication system of the present invention may have the following configuration. That is, a seat includes an audio output unit and a receiving antenna for receiving audio information, and the path changing unit changes the path so as to output audio information to the audio output unit through the receiving antenna equipped on a seat paired.

Such a configuration allows the image display device to receive audio information from the antenna on a seat by wireless communications, thereby improving the convenience of the wireless communication system.

A wireless communication system of the present invention may have the following configuration. That is, the image display device includes an audio information output unit, and the path changing unit changes the path so as to output audio information to the audio output unit equipped on the image display device.

Such a configuration allows the image display device to present audio and video information service, thereby improving the convenience of the wireless communication system. Additionally, the configuration eliminates a wiring facility for providing audio information, thereby reducing the installation cost of the wireless communication system.

Figure 1A:
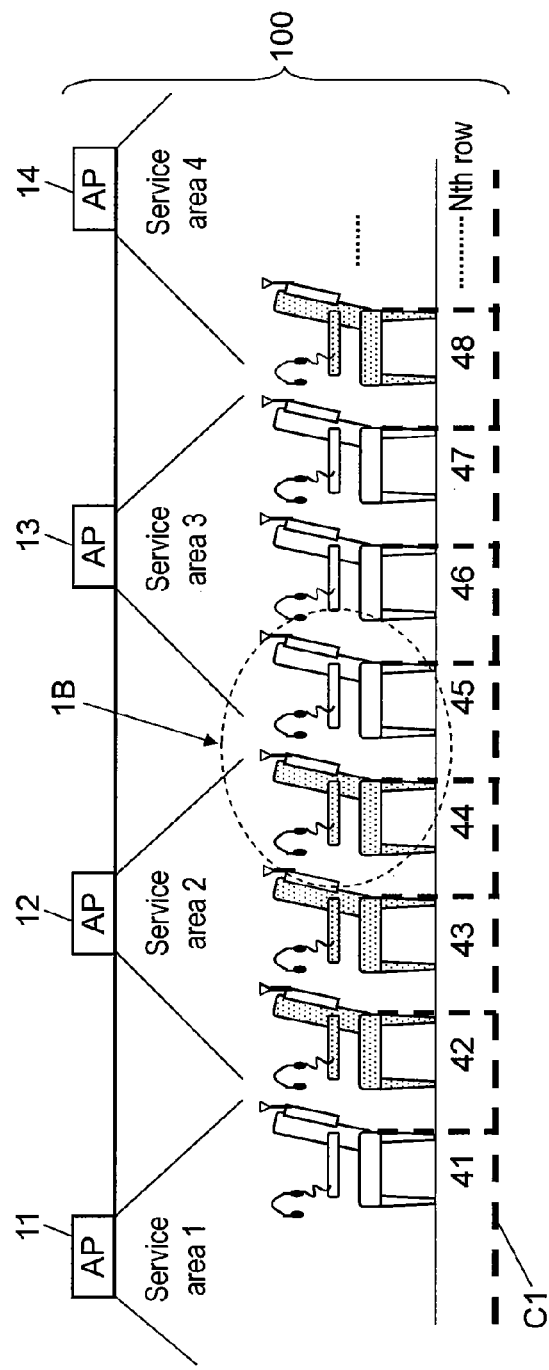
FIG. 1A is a main layout drawing of a portable monitor and a wireless communication system according to the first exemplary embodiment of the present invention.

REFERENCE MARKS IN THE DRAWINGS 11, 12, 13, 14 Access point (AP)
41, 42, 43, 44, 45, 46, 47, 48 Row of seats
41D, 42D, 43D, 45D, 46D Portable monitor
42E, 43E, 45E Earphones
42M, 43M, 44M, 45M Seat
43A, 45A Antenna
43J, 45J Armrest
43S, 45S Sensor
45H Handset
45L Audio output unit
45P Display panel
45Q User
45T, 814 Audio output unit
100 Wireless communication system
700, 820 Sensor unit
701, 742, 821 Sending/receiving unit
702 Set-in sensor unit
710 Touch-panel unit
711, 833 Channel switching unit
712, 831 CA call unit
713, 832 Lighting unit
730, 810 Processing unit
731 Position information receiving unit
732 Position information compare unit
733 AV information receiving unit
733A Video receiving unit
734 AV separation unit
735 Video display unit
736, 813 Audio input/output unit
737 Data sending/receiving unit
738 Channel switching unit
739 AV information request unit
740 Wireless module
741 Modulating/demodulating unit
750, 850 Antenna
751 Directivity switching unit
760, 800 Memory unit
761, 801 Position information storage unit
770, 840 External input/output unit
780 Earphones
781 Audio output unit
782, 816 Insertion sensor unit
811 Position information call unit
812 Data output unit 815 Audio receiving unit
830 Handset
851 Receiving unit

DETAILED DESCRIPTION OF PREFERRED EMBODIMENTS

Hereinafter, a detailed description is made of some embodiment of the present invention referring to FIGS. 1 through 14.

First Exemplary Embodiment

FIG. 1A is a main layout drawing showing the configuration of an image display device (hereinafter, referred to as "portable monitor" and abbreviated as "portable monitor D" to collectively call plural portable monitors) and wireless communication system 100 according to the first exemplary embodiment of the present invention.

As shown in FIG. 1A, in the cabin of an aircraft, plural seat rows 41, 42, 43, . . . are arranged in N rows lengthwise and M lines crosswise (refer to FIG. 5), where each seat is provided with portable monitors 41D, 42D, 43D, . . . (not shown). Data such as audio data and information data is received via access points (hereinafter, collective access points are abbreviated as AP) 11, 12, 13, and 14 as wireless base stations to present data service to passengers. Each of AP 11, 12, 13, and 14 has a service area of three rows of seats lengthwise, and four service areas 1, 2, 3, and 4 are provided for seat rows 41 through 48. Underneath the floor of each seat, Ethernet (registered trademark) C1 for control connected to the server is disposed, where unicast communication method is used for sending/receiving data between portable monitor D and AP.

Figure 1B:
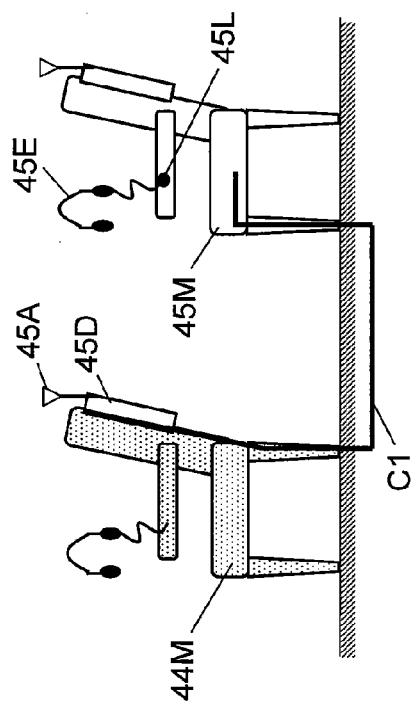
FIG. 1B is an enlarged partial view of the part shown by broken line 1B in FIG. 1A.

FIG. 1B is an enlarged partial view of the part shown by broken line 1B in FIG. 1A, showing the major configuration of wireless communication system 100 at seat 44M (Mth line, 44th row) and seat 45M (Mth line, 45th row). Hereinafter, a description is made of portable monitor D and wireless communication system 100 according to the first embodiment of the present invention using the case of seat 44M and seat 45M as an example.

Each of seats 44M, 45M in service area 3 of AP 13 is equipped with earphones. Portable monitor 45D attached to the back of seat 44M with a retention mechanism (not shown) has antenna 45A. Then, portable monitor 45D receives video information from AP 13 to display an image. Meanwhile, portable monitor 45D is connected to Ethernet (registered trademark) C1 for control as an underfloor wired transmission line; outputs audio from audio output unit 45L on seat 45M to present audio information to a user (passenger) through earphones 45E.

Figure 2A:
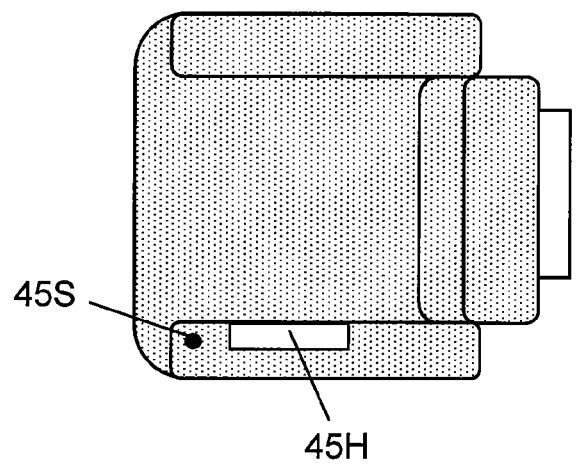
FIG. 2A is a plan view showing the major configuration of a seat, in the same wireless communication system.
Figure 2B:
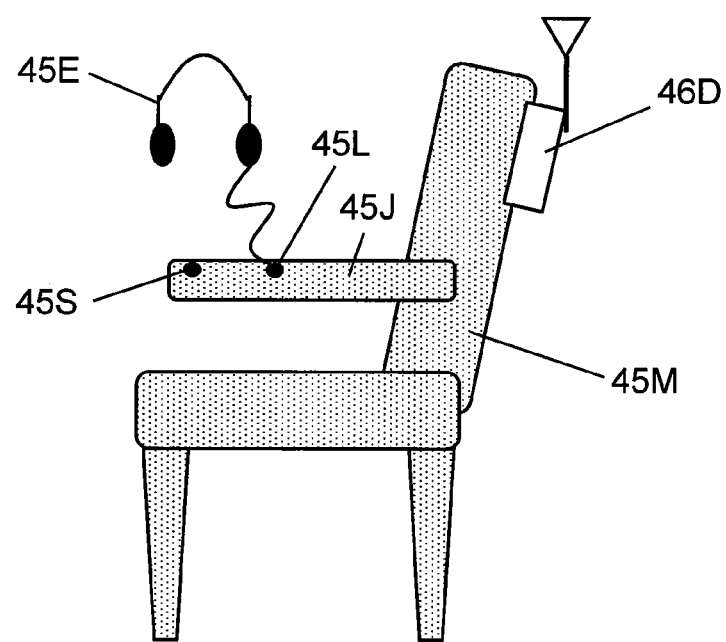
FIG. 2B is a side view showing the major configuration of a seat, in the same wireless communication system.

FIG. 2A is a plan view showing the major configuration of seat 45M in wireless communication system 100 according to the present embodiment. FIG. 2B is a side view showing the major configuration of seat 45M in wireless communication system 100 according to the present embodiment. As shown in FIGS. 2A and 2B, the back of seat 45M attachably retains portable monitor 46D with a retention mechanism. Armrest 45J of seat 45M has handset 45H and sensor 45S embedded thereinto. Sensor 45S transmits and receives position information of portable monitor 46D and seat 45M. Herewith, each seat transmits and receives position information with portable monitor D; portable monitor D accesses the server (not shown) through AP by wireless method; and handset 45H accesses the server via Ethernet (registered trademark) C1 for control.

Next, a description is made of the function of the wireless system in a case where portable monitor D is moved.

Figure 3A:
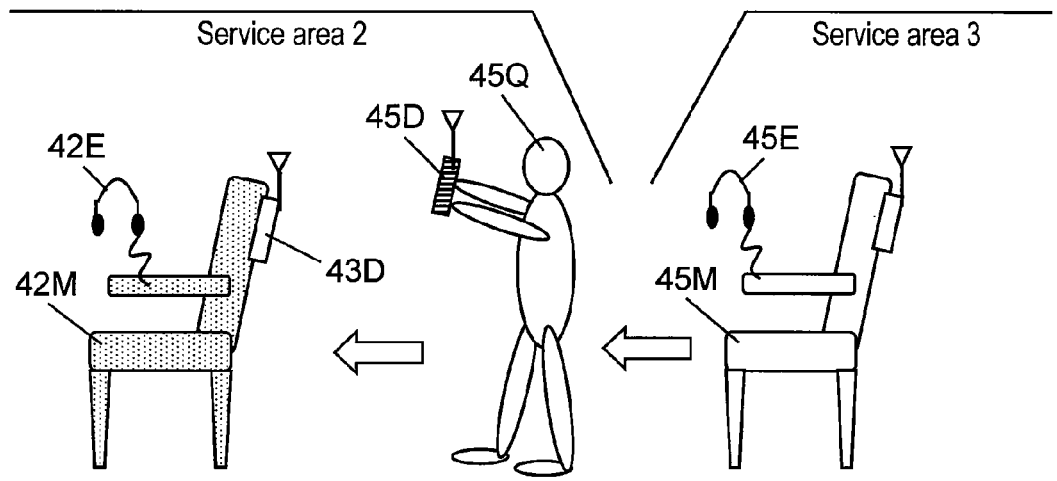
FIG. 3A is an explanatory diagram showing the same wireless communication system in use, in a case where the user is moving while carrying the portable monitor.

FIG. 3A shows a state in which user 45Q is moving while carrying portable monitor 45D. User 45Q detaches portable monitor 45D in service area 3 of AP 13 from seat 44M and moves to seat 42M in service area 2 of AP 12.

Figure 3B:
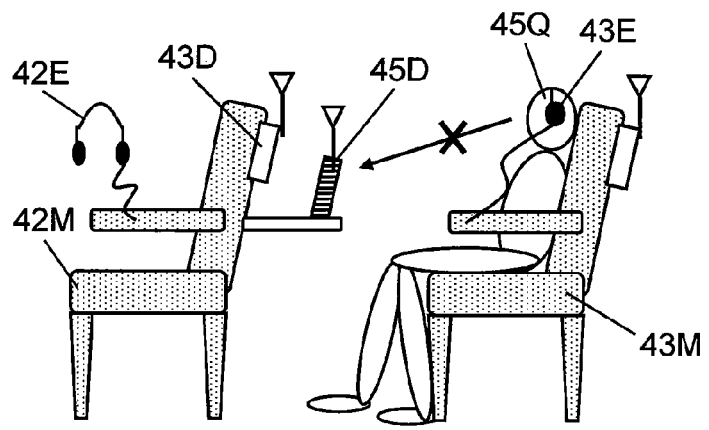
FIG. 3B is an explanatory diagram showing the same wireless communication system in use, in a case immediately after the user has moved while carrying the portable monitor.

FIG. 3B shows a state immediately after user 45Q has moved while carrying portable monitor 45D. At this time, what is set to be paired with seat 42M is portable monitor 43D placed on the back of seat 42M. Hence, in this state, audio information set in portable monitor 45D cannot be output from seat 43M. If a CA call and lighting are operated at portable monitor 45D, those at seat 45M are activated.

Figure 4A:
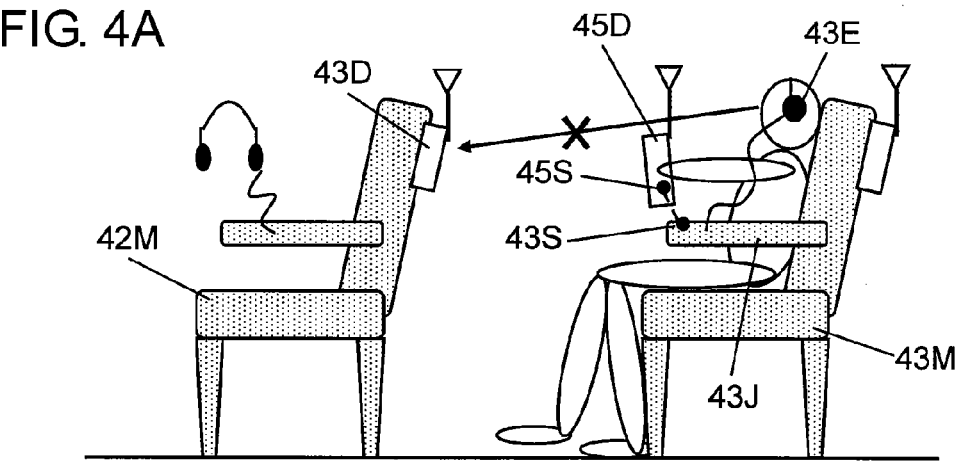
FIG. 4A is a side view for illustrating the function of the same wireless communication system.
Figure 4B:
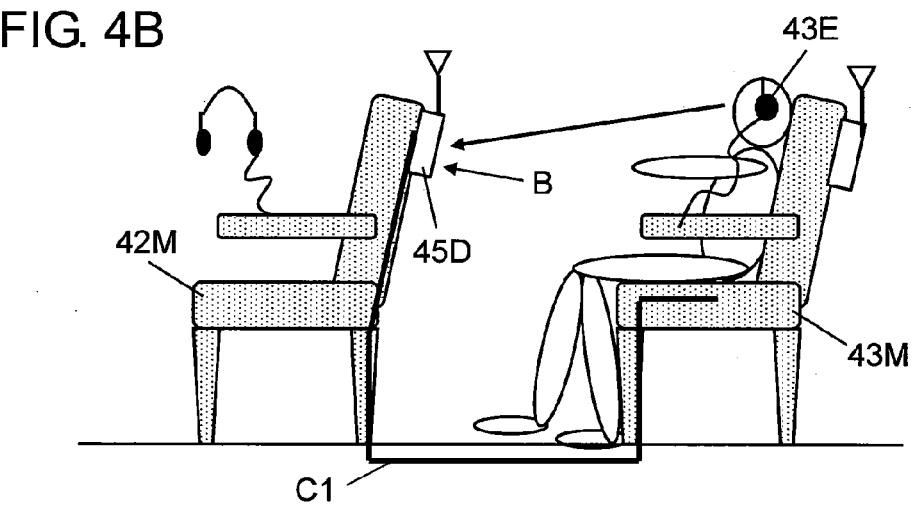
FIG. 4B is a side view for illustrating the function of the same wireless communication system.
Figure 4C:
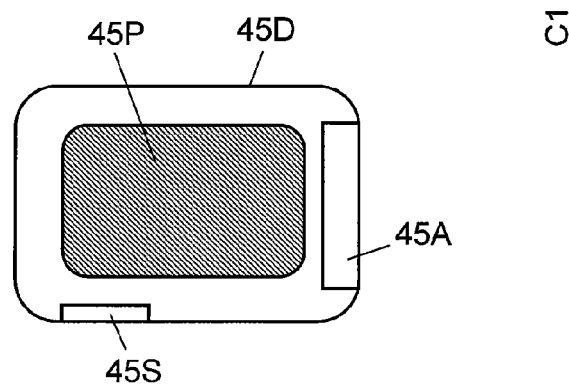
FIG. 4C is a plan view of the portable monitor of the same wireless communication system.

FIGS. 4A and 4B are side views for illustrating the function of wireless communication system 100 according to the present embodiment, showing a method of pairing between destination portable monitor 45D and seat 42M; and a method of viewing in-flight information presentation service. As shown in FIG. 4C, portable monitor 45D includes display panel 45P, antenna 45A, and sensor 45S. Sensor 45S transmits and receives information with sensor 43S disposed on armrest 43J of seat 43M to perform sensing. As a result, portable monitor 45D acquires position information on a seat allocated to seat 43M through sensors 45S and 43S, allowing seat 43M and portable monitor 45D to construct new pairing. Portable monitor 45D having undergone pairing is attached to a retention mechanism (not shown) provided on the back of seat 42M. Herewith, user 45Q can listen to audio with earphones 43E at seat 43M by using audio feedback.

Position information transmitted and received between seat 43M and portable monitor 45D includes information related to AP connected, antenna directivity information, SSID, IP address, and MAC address, for example. Here, information unique to each seat is allocated for AP information, SSID, IP address, and MAC address.

Figure 5:
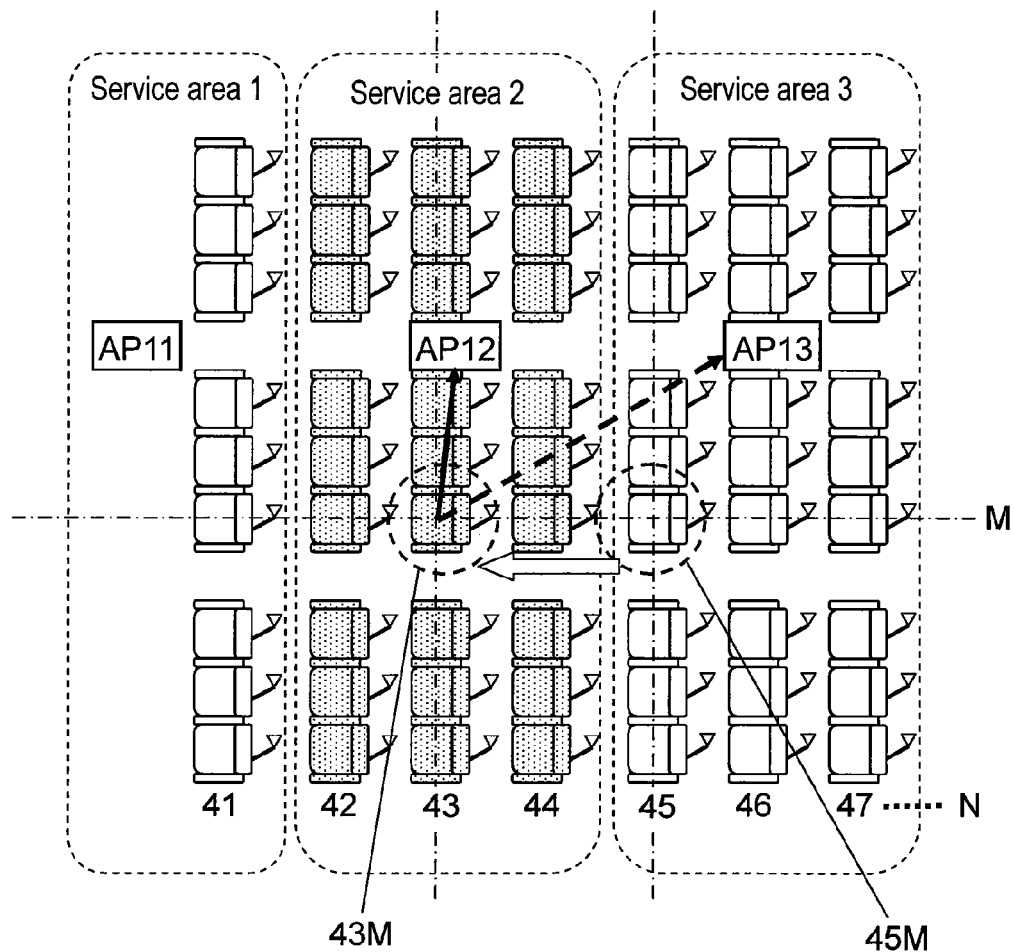
FIG. 5 is a plan view showing the arrangement relationship between AP (access points) and a portable monitor of the same wireless communication system.
Figure 6:
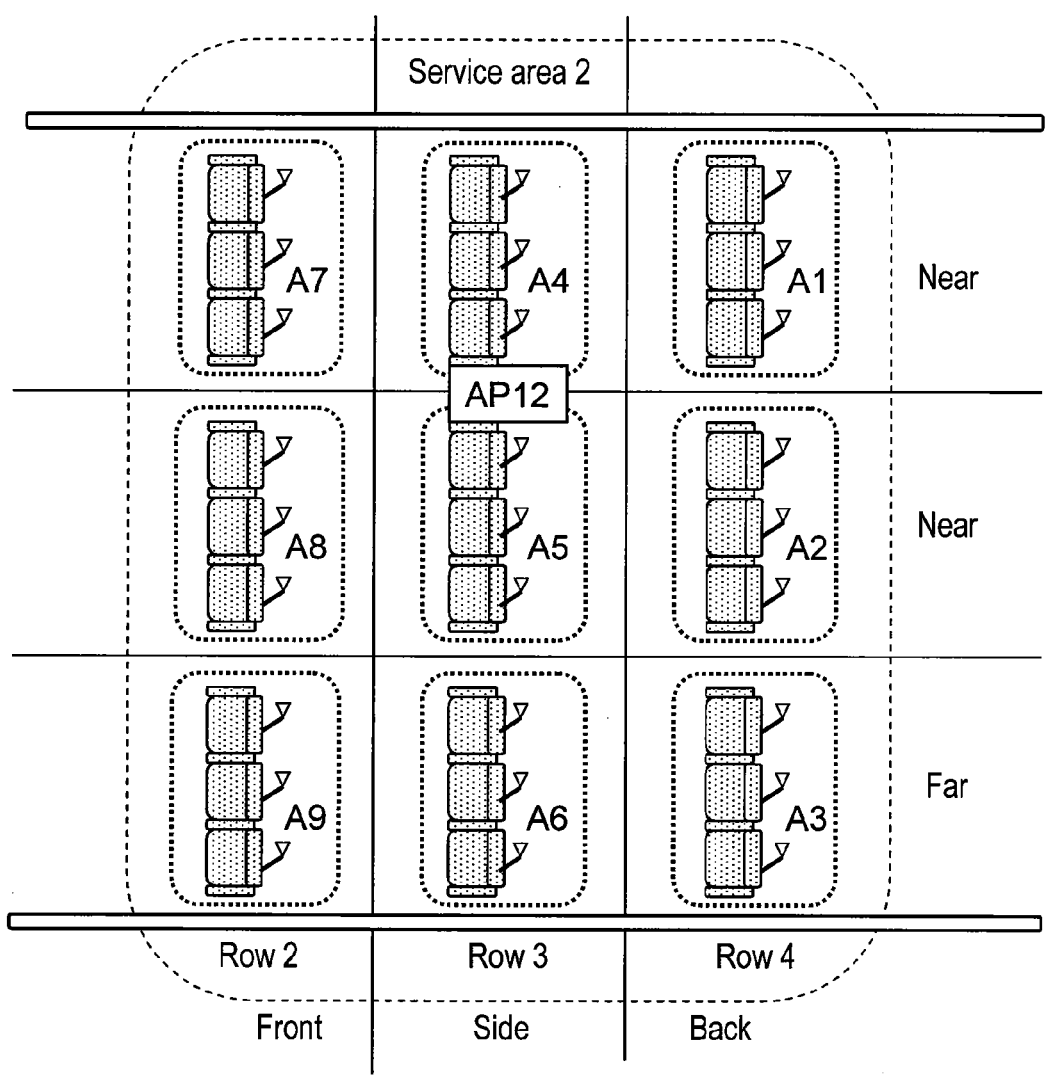
FIG. 6 is a plan view showing the arrangement relationship between AP and a portable monitor of the same wireless communication system.

Next, a description is made of setting for service areas 1, 2, and 3 of AP 11, 12, and 13, and for the directivity of the antenna on portable monitor D. FIGS. 5 and 6 are plan views showing the arrangement relationship between AP 11, 12, and 13, and portable monitor 45D in wireless communication system 100 according to the embodiment.

As shown in FIG. 5, when a user of the information presentation service moves from seat 45M to seat 43M while carrying portable monitor 45D, AP to be connected is changed from AP 13 to AP 12.

Next, a description is made of directivity information of the antenna provided on portable monitor D for AP 12 for example using FIG. 6. In the wireless communication system according to the first embodiment of the present invention, service area 2 of AP 12 is divided into small areas A1 through A9 (front, side, and back by left, center, and right). In an aircraft, seats are fixed and the moving range of a user being seated is limited. Hence, information allocated from among small areas A1 through A9 is imparted to each seat, and when receiving position information from a seat, portable monitor D changes the directivity of the antenna to a setting corresponding to the position information. The directivity of the antenna is determined for each seat, and thus computing process for determining the directivity is not required.

Figure 7:
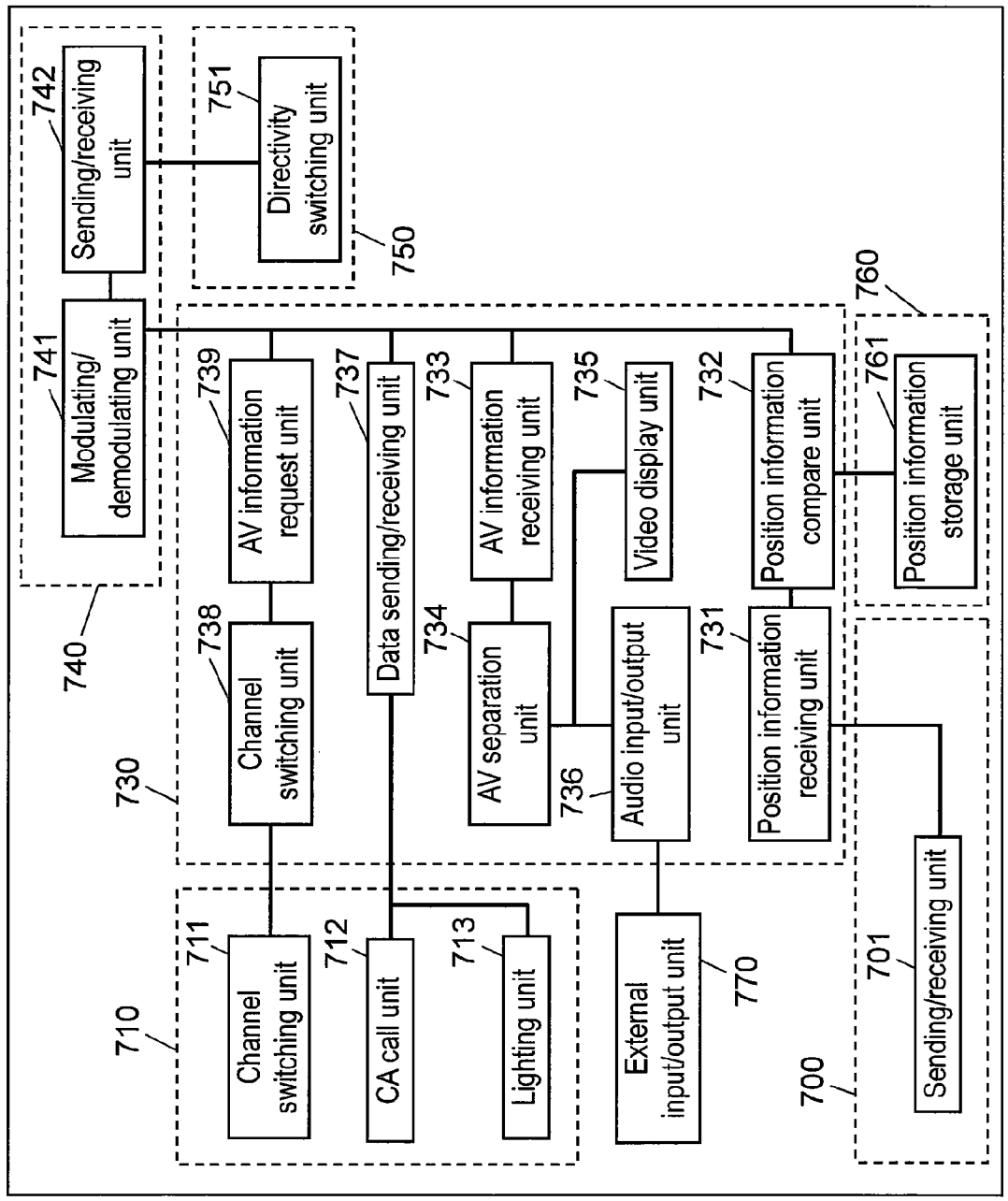
FIG. 7 is a block diagram showing the circuit structure of a portable monitor of the same wireless communication system.

Next, a description is made of the detailed circuit structure of portable monitor 45D using FIG. 7.

FIG. 7 is a block diagram showing the circuit structure of portable monitor D in wireless communication system 100 according to the present embodiment. As shown in FIG. 7, portable monitor 45D is composed of sensor unit 700, touch-panel unit 710, processing unit 730, wireless module 740, antenna 750, memory unit 760, and external input/output unit 770.

Antenna 750 includes directivity switching unit 751. Directivity switching unit 751 calls a table determining the directivity of antenna 45A on the basis of position information to change the directivity of antenna 45A. Memory unit 760 includes position information storage unit 761. Position information storage unit 761 stores position information of portable monitor 45D at its initial position.

Sensor unit 700 includes sending/receiving unit 701. Sending/receiving unit 701 receives information sent from sensor 43S on seat 43M. Sensor 43S uses RFID (radio-frequency identification) for example.

Touch-panel unit 710 is composed of channel switching unit 711, CA call unit 712, and lighting unit 713. Channel switching unit 711 changes AV information. CA call unit 712 detects a state in which a CA call button has been pressed with touch-panel unit 710. Lighting unit 713 detects a state in which a lighting button has been pressed with the touch-panel unit.

Processing unit 730 is composed of position information receiving unit 731, position information compare unit 732, AV information receiving unit 733, AV separation unit 734, video display unit 735, audio input/output unit 736, data sending/receiving unit 737, channel switching unit 738, and AV information request unit 739.

Position information receiving unit 731 receives position information received by sensor unit 700. Position information compare unit 732 compares position information preliminarily possessed by the monitor, stored in position information storage unit 761 of memory unit 760; with new position information received by sensor unit 700 from seat 43M. AV information receiving unit 733 receives AV information from AP 12. AV separation unit 734 separates AV information received by AV information receiving unit 733 into video information and audio information. Video display unit 735 displays video information separated by AV separation unit 734 on display panel 45P shown in FIG. 4C. Audio input/output unit 736 is connected to seat 43M via a wired line to input and output audio information. Data sending/receiving unit 737 receives content data of information presentation service from AP 12 and transmits CA call data, lighting data, and channel change data from seat 43M to AP 12.

Channel switching unit 738 processes a channel change request received from touch-panel unit 710. AV information request unit 739 requests AP 12 to change the channel.

Wireless module 740 is composed of modulating/demodulating unit 741 and sending/receiving unit 742. Modulating/demodulating unit 741 modulates an AV information change request received from processing unit 730 and demodulates AV information. Sending/receiving unit 742 transmits information received from processing unit 730 to AP 12 and receives AV information from AP 12.

External input/output unit 770 transfers audio data to seat 43M via a wired line.

Next, a description is made of the flows of position information, AV information, channel change request information, CA call information, and lighting operation information in portable monitor 45D.

Position information is transmitted from seat 43M and received by sending/receiving unit 701 of sensor unit 700 provided on portable monitor 45D. Next, it is compared with the past position information that has been received by position information receiving unit 731 of processing unit 730; sent from position information receiving unit 731 to position information compare unit 732; and retained by portable monitor 45D in position information storage unit 761 of memory unit 760. Here, if the past position information is different from the position information received, the received position information from seat 43M is stored as new information. The new position information is used to determine AP 12 to be connected and the directivity of antenna 45A; the information is sent to wireless module 740; and it is modulated by modulating/demodulating unit 741. After that, data is sent to sending/receiving unit 742; and the directivity of antenna 45A is changed while a connection request is transmitted to AP 12.

AV information is sent from the server through AP 12 by sending a connection request from portable monitor 45D to AP 12. The AV information is received by antenna 750 of portable monitor 45D and sent to sending/receiving unit 742 of wireless module 740. After that, the AV information is demodulated by modulating/demodulating unit 741 and sent to processing unit 730. In processing unit 730, the AV information is received by AV information receiving unit 733 and is separated into video and audio data by AV separation unit 734. The video data is displayed on display panel 45P of video display unit 735. The audio information is input from audio input/output unit 736 to external input/output unit 770. Then, the audio information is sent to seat 43M via Ethernet (registered trademark) C1 for control.

Channel change request information is sent to channel switching unit 738 of processing unit 730; modulated by modulating/demodulating unit 741 of wireless module 740 through AV information request unit 739; and sent to AP 12. Channel change data that AP 12 has received is sent to the server via Ethernet (registered trademark). The channel change data enables changing the channel by the same operation as that of the transmission method of AV information.

Next, CA call information and lighting operation information is sent to AP 12 through data sending/receiving unit 737 of processing unit 730 and then sent to server for processing. Here, FIG. 4C shows an appearance of portable monitor 45D, but the arrangement of antenna 45A, sensor 45S, and display panel 45P is not limited to the appearance.

As described above, an image display device according to the present embodiment includes receiving antenna 45A for receiving information by changing access points as different plural wireless base stations. The image display device can move between seats and includes sensor unit 700 as a seat information acquiring unit acquiring position information of a destination seat paired; processing unit 730 as a wireless base station selecting unit selecting a wireless base station to be connected on the basis of position information; and directivity switching unit 751 as a directivity switching unit changing the directivity of the receiving antenna on the basis of position information.

Figure 8:
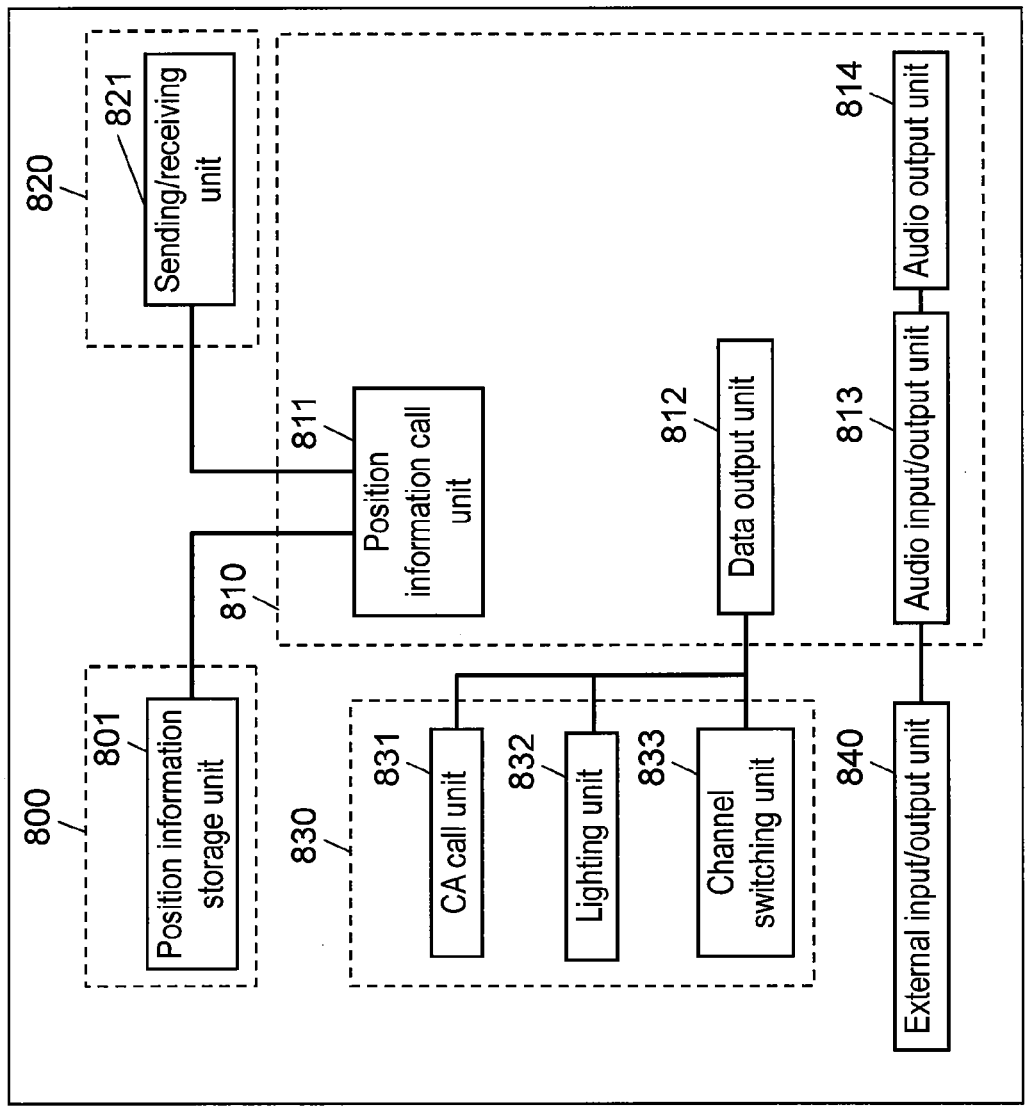
FIG. 8 is a block diagram showing the configuration of the circuit part equipped on a seat in the same wireless communication system.

Next, a description is made of the configuration of the circuit part equipped on seat 43M using FIG. 8. FIG. 8 is a block diagram showing the configuration of the circuit part equipped on seat 43M in wireless communication system 100 according to the present embodiment.

Seat 43M is composed of memory unit 800, processing unit 810, sensor unit 820, handset 830, and external input/output unit 840.

Memory unit 800 includes position information storage unit 801, which stores position information corresponding to each seat.

Handset 830 is composed of CA call unit 831, lighting unit 832, and channel switching unit 833. CA call unit 831 sends information to processing unit 810 when the CA call button of handset 830 is pressed. Lighting unit 832 sends information to processing unit 810 when the lighting button of handset 830 is pressed. Channel switching unit 833 sends a channel change request to the server through processing unit 810.

Processing unit 810 is composed of position information call unit 811, data output unit 812, audio input/output unit 813, and audio output unit 814. Position information call unit 811 calls position information from position information storage unit 801 and sends it to sensor unit 820. Data output unit 812 receives CA call information, lighting information, and channel change information from handset 830 and outputs them to Ethernet (registered trademark) C1 for control. Audio input/output unit 813 inputs and outputs audio information from portable monitor 45D via Ethernet (registered trademark) C1 for control. Audio output unit 814 outputs audio through earphones 45E. Sensor unit 820 includes sending/receiving unit 821. Sending/receiving unit 821 transmits position information received from processing unit 810 to portable monitor 45D.

Next, a description is made of a flow of position information at seat 43M. When seat 43M is sensed, portable monitor 45D requests data, which is received by the receiver of sensor unit 820. After that, position information call unit 811 of processing unit 810 accesses position information storage unit 801 of memory unit 800 to call position information. The position information is transmitted from sending/receiving unit 821 of sensor unit 820 to portable monitor 45D.

Next, a description is made of an information flow at handset 830. Channel change information, CA call information, or channel change information operated from handset 830 is sent from processing unit 810 to the server through Ethernet (registered trademark) C1 for control. Audio information sent from portable monitor D via a wired line is passed to audio input/output unit 813 of processing unit 810 through external input/output unit 840 and is output by audio output unit 814.

As described above, seat 43M includes audio output unit 814 and Ethernet (registered trademark) C1 for control as a wired transmission line connecting between image display device (portable monitor) 45D and audio output unit 814 on seat 43M paired. Processing unit 810 as a path changing unit changes the path through a wired transmission line so that audio information is output to the audio output unit.

Second Exemplary Embodiment

Figure 9A:
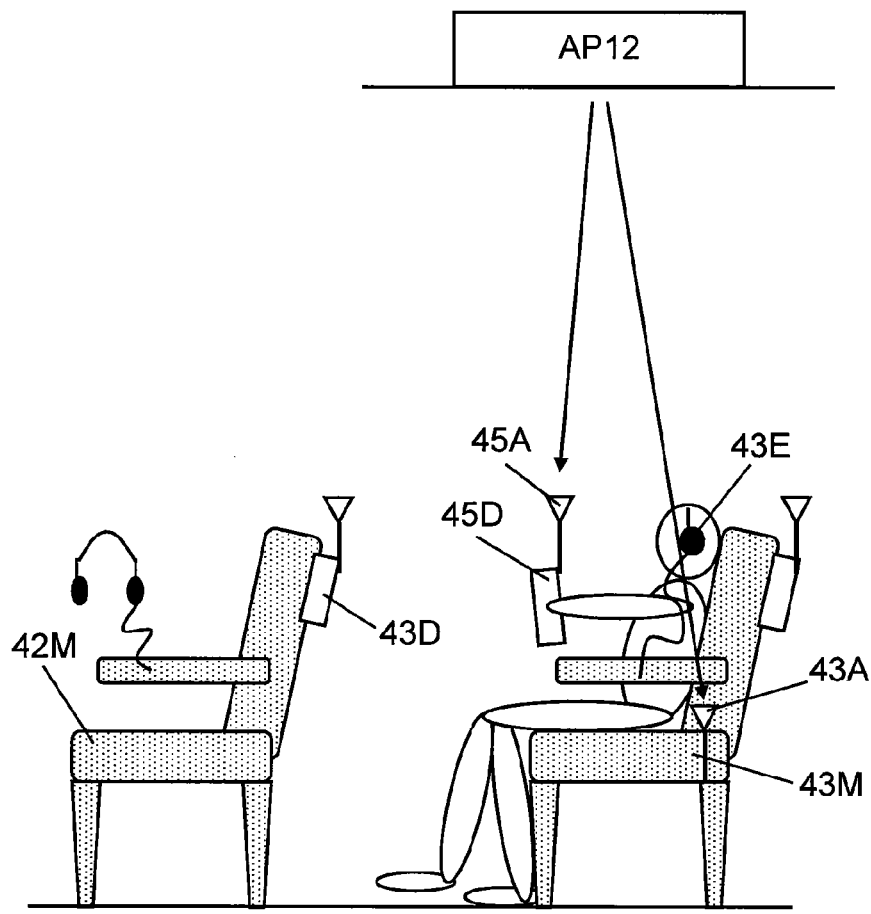
FIG. 9A is a side view for illustrating the configuration of a wireless communication system according to the second exemplary embodiment of the present invention, showing a method of pairing between a destination portable monitor and a seat; and a method of viewing in-flight information presentation service.
Figure 9B:
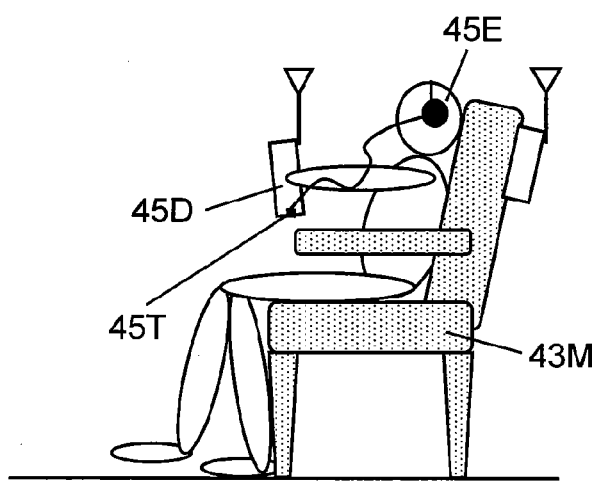
FIG. 9B is a side view for illustrating the configuration of another example of a wireless communication system according to the second embodiment of the present invention, showing an example where an audio output unit is disposed in a portable monitor.
Figure 10:
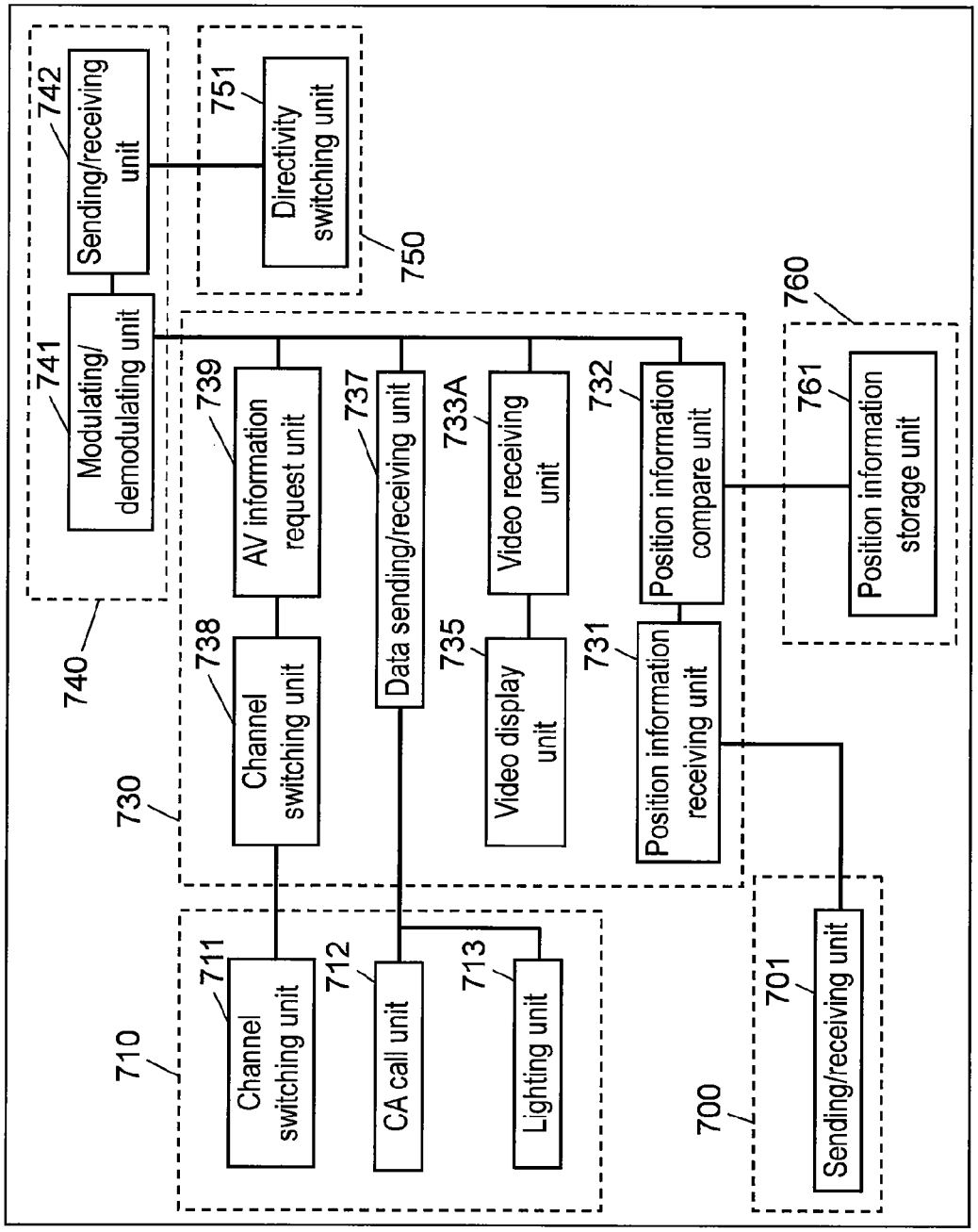
FIG. 10 is a block diagram showing the circuit structure of a portable monitor of the same wireless communication system.
Figure 11:
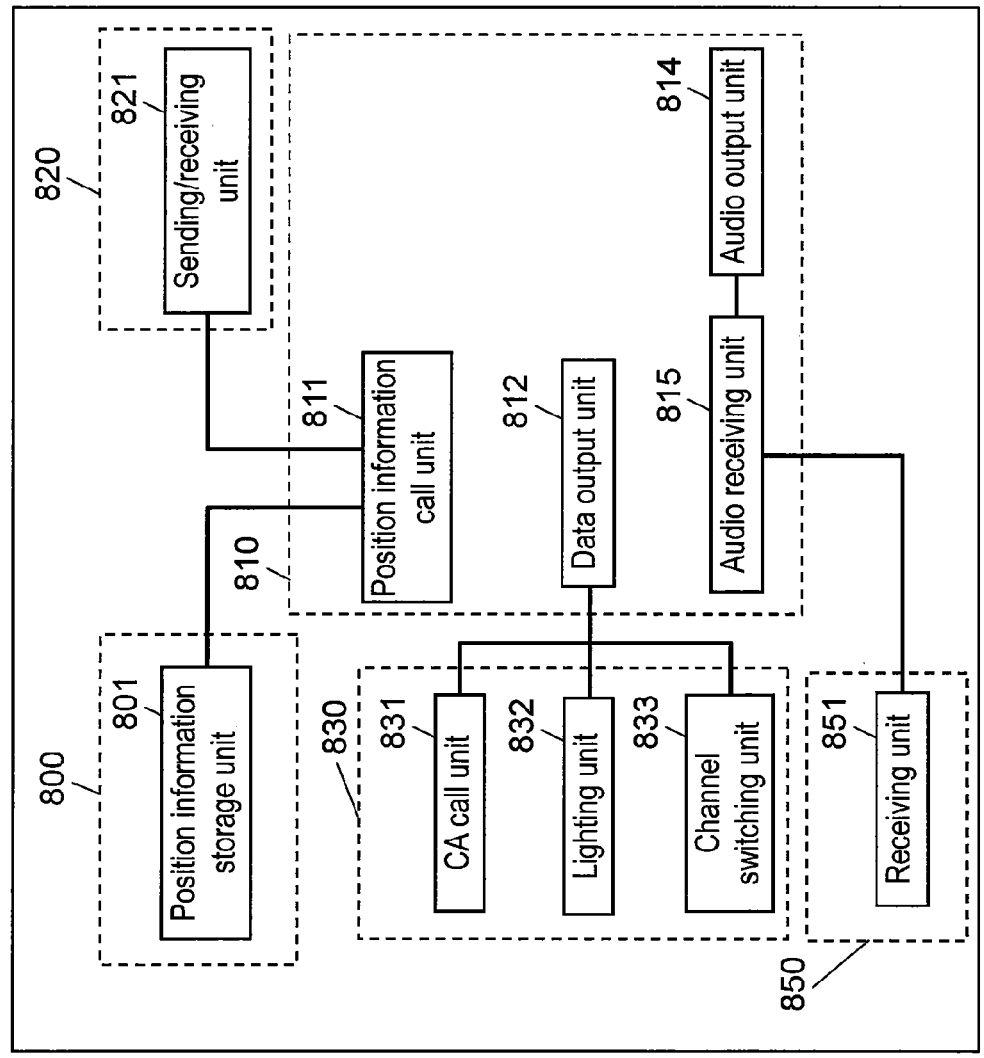
FIG. 11 is a block diagram showing the configuration of the circuit part equipped on a seat in the same wireless communication system.

Next, a description is made of wireless communication system 100 according to the second exemplary embodiment of the present invention using FIGS. 9 through 11.

FIGS. 9A and 9B are side views for illustrating the configuration of wireless communication system 100 according to the present embodiment. FIG. 9A shows a method of pairing between destination portable monitor 45D and seat 43M; and a method of viewing in-flight information presentation service. In this embodiment, in addition to antenna 45A of portable monitor 45D, antenna 43A is disposed on seat 43M. Information transmitted from AP 12 is separated into video information destined to portable monitor 45D and audio information destined to seat 43M, and transmitted and received separately. Hence, portable monitor 45D does not need to be connected to seat 43M via a wired line for delivering audio. Consequently, audio feedback is not necessary, and information presentation service is available without requiring portable monitor 45D attached to the back of seat 42M.

As described above, wireless communication system 100 according to the present embodiment includes an image display device and transmits at least one of video information and audio information to a user seated on seat 43M via access point (AP) 12 as a wireless base station.

FIG. 10 is a block diagram showing the circuit structure of portable monitor 45D in wireless communication system 100 according to the present embodiment. Portable monitor 45D does not receive audio information, and thus is not provided with AV information receiving unit 733, AV separation unit 734, audio input/output unit 736, or external input/output unit 770, and video receiving unit 733A is added instead of AV information receiving unit 733 of processing unit 730, as compared to FIG. 7. Video receiving unit 733A receives video information transmitted from the server to portable monitor 45D through AP 12 and demodulated by wireless module 740. The other blocks are the same as those in the first embodiment, and thus the same reference marks are given to omit their description.

FIG. 11 is a block diagram showing the configuration of the circuit part equipped on seat 43M in wireless communication system 100 according to the present embodiment. FIG. 11 is different from FIG. 8 in that antenna 850 for receiving audio information is added instead of removing audio input/output unit 813, and audio receiving unit 815 is added to processing unit 810. Antenna 850 receives information on AP 12. Audio receiving unit 815 receives audio information from antenna 850.

As described above, seat 43M in the wireless communication system according to the present embodiment is equipped with audio output unit 814 and antenna 850 including receiving antenna 43A for receiving audio information. Processing unit 810 as a path changing unit changes the path through receiving antenna 45A so that audio information is output to audio output unit 814.

A flow of audio information in the present embodiment is described below. Audio information is sent from the server through AP 12, and received by antenna 850 and audio receiving unit 815 of processing unit 810. Audio information received is output by audio output unit 814.

Next, another example of the second embodiment, in which audio output unit 45T is disposed in portable monitor 45D, is shown using FIG. 9B. In this example, a user seated on seat 43M can receive audio information through portable monitor 45D by inserting earphones 45E into audio output unit 45T of portable monitor 45D.

As described above, the image display device included in a wireless communication system according to the present embodiment includes audio output unit 45T as an audio information output unit, and processing unit 730 as a path changing unit changes the path so that audio information is output to the audio information output unit equipped on the image display device.

Third Exemplary Embodiment

Figure 12:
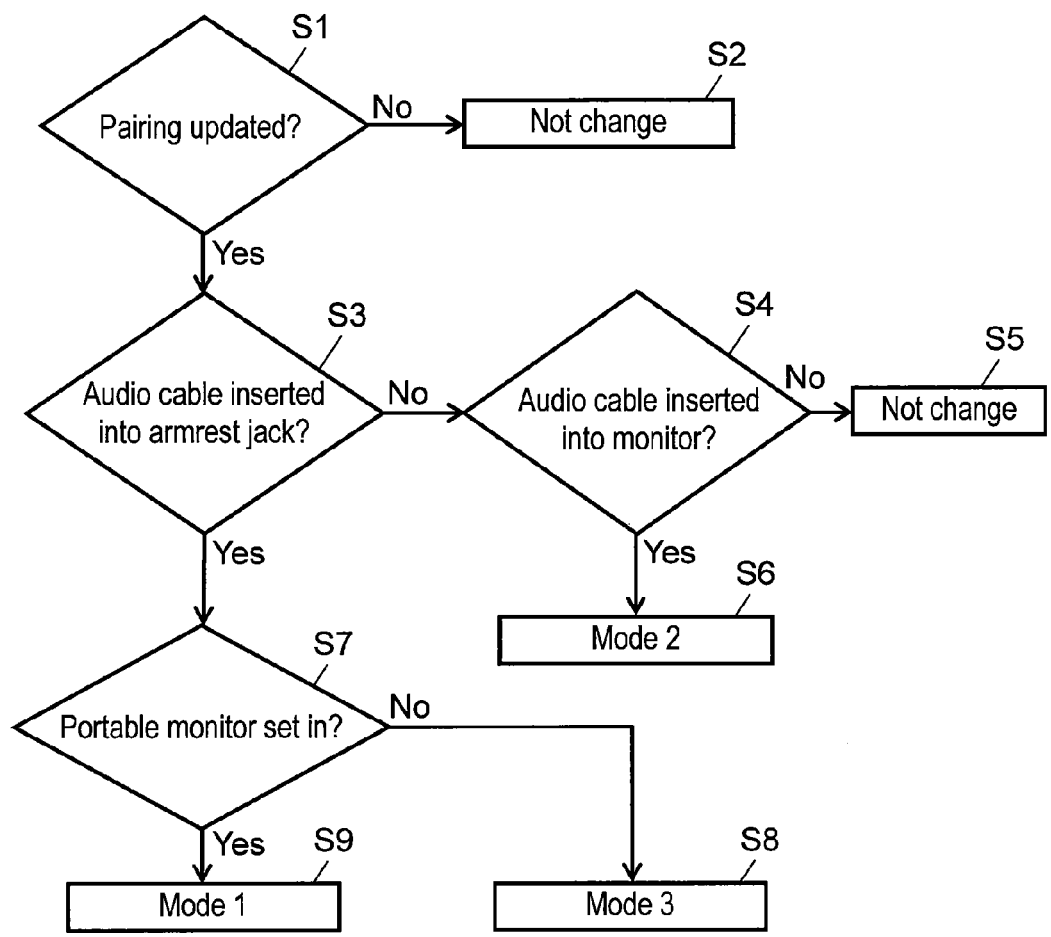
FIG. 12 is a flowchart showing operation of a wireless communication system according to the third exemplary embodiment of the present invention.
Figure 13:
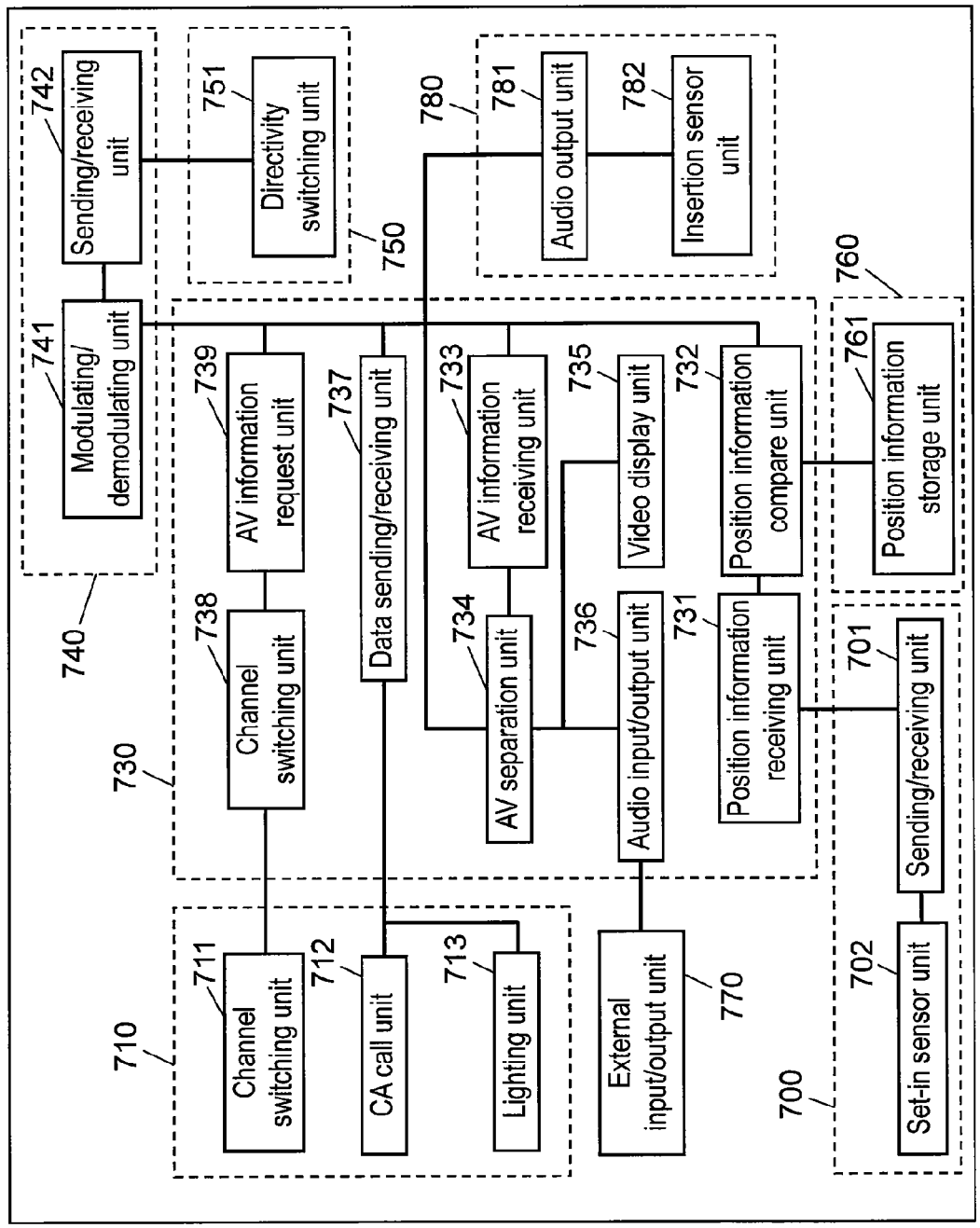
FIG. 13 is a block diagram showing the configuration of the circuit part of a portable monitor of the same wireless communication system.
Figure 14:
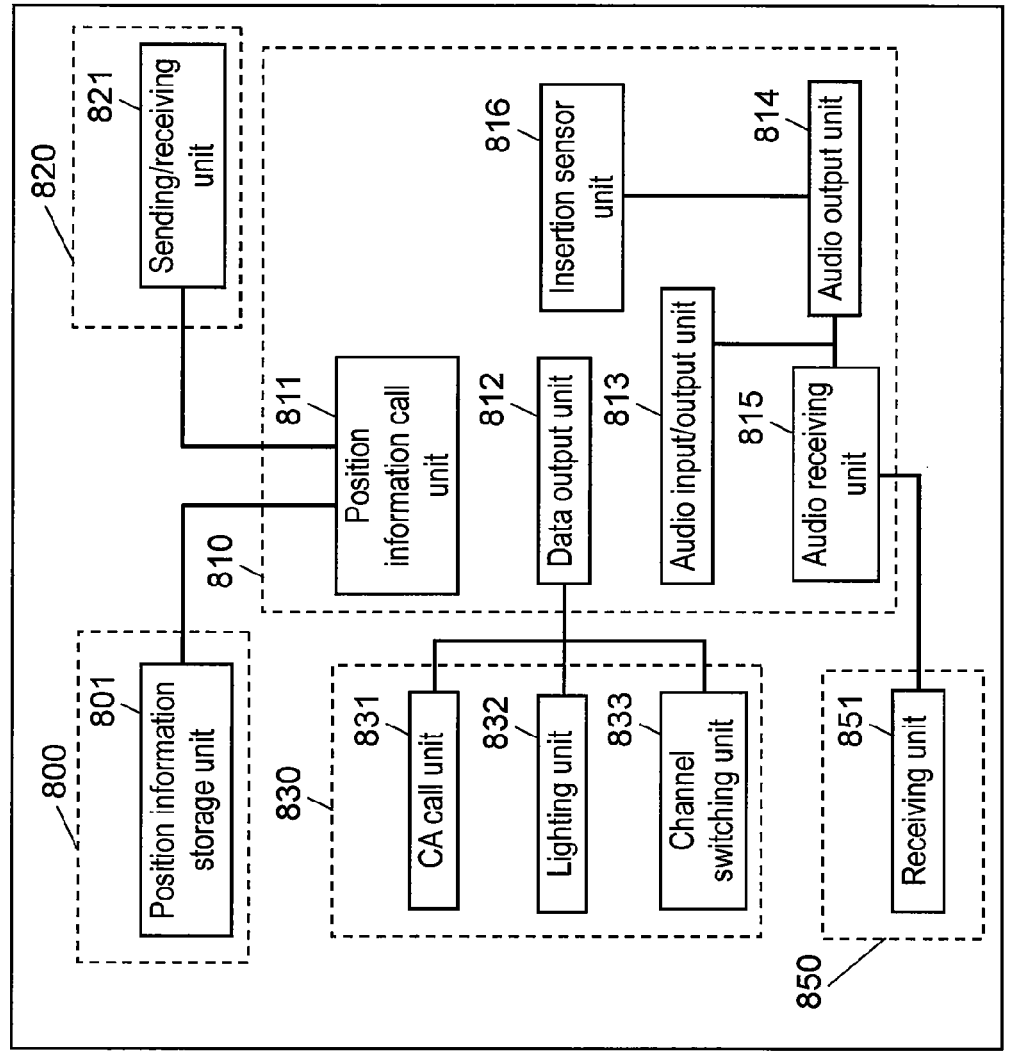
FIG. 14 is a block diagram showing the configuration of the circuit part equipped on a seat in the same wireless communication system.

Next, a description is made of a wireless communication system according to the third embodiment, that allows switching three types of view modes (mode 1, mode 2, mode 3) in accordance with a user's usage environment, using FIGS. 12 through 14. Mode 1, related to receiving audio information, is for receiving audio information through the path shown in FIG. 1B, where audio information is received by audio feedback method via a wired line. Mode 2 is for receiving audio information through the path shown in FIG. 9A, where radio waves transmitted from AP 12 are received by antenna 43A provided on a seat. In mode 3, as shown in FIG. 9B, by inserting earphones 45E into audio output unit 45T disposed on portable monitor 45D, audio information is received via portable monitor 45D.

A description is made of a method of changing a view pattern in a wireless communication system according to the present embodiment using FIG. 12. FIG. 12 is a flowchart showing operation of the wireless communication system according to the present embodiment, showing a method of changing three types of modes (mode 1, mode 2, mode 3). First, in step S1, judgement is made whether the pairing has been updated. If not updated (No), the process proceeds to step S2 and the view method is not changed. If updated (Yes), checking is made whether earphones 45E are inserted into audio output unit 45T on seat 43M (step S3). If earphones 45E are not inserted into seat 43M (No), checking is made whether earphones 45E are attached to portable monitor 45D (step S4). If earphones 45E are not attached to portable monitor 45D (No), the view method is not changed (step S5). If earphones 45E are attached to portable monitor 45D (Yes), the view method is changed to mode 2 (step S6). If earphones 45E are attached to seat 43M (Yes), checking is made whether portable monitor 45D is set into the monitor recess of seat 43M (step S7). If not set in (No), the view method is changed to mode 3 (step S8). If set in (Yes), the process proceeds to step S9 and the view method is changed to mode 1 (step S9).

FIG. 13 is a block diagram showing the configuration of the circuit part of portable monitor 45D in a wireless communication system according to the present embodiment. In FIG. 13, audio output unit 781 outputting audio information, set-in sensor unit 702 and insertion sensor unit 782 for detecting usage of portable monitor 45D are added to a case where the configurations of FIG. 7 and FIG. 10 are combined and earphones 45E are inserted directly into portable monitor 45D. The other blocks are the same as those in the first and second embodiments, and thus reference marks same as those in FIGS. 7 and 10 are given to omit their description.

Set-in sensor unit 702 detects whether portable monitor 45D is set into seat 43M. Audio output unit 781 is a jack at which earphones 45E are connected directly to portable monitor 45D, and insertion sensor unit 782 detects whether earphones 45E are attached to portable monitor 45D. These detection functions are used for determining modes 1, 2, 3. When set-in sensor unit 702 detects that portable monitor 45D is set into seat 43M, mode 1 is selected. When insertion sensor unit 782 detects that earphones 45E are attached to portable monitor 45D, mode 2 is selected.

FIG. 14 is a block diagram showing the configuration of the circuit equipped on seat 43M in a wireless communication system according to the present embodiment. In FIG. 14, insertion sensor unit 816 is added to audio output unit 814 in a case where the configurations of FIG. 8 and FIG. 11 are combined. Insertion sensor unit 816 detects whether earphones 45E are connected to seat 43M. When earphones 45E are detected at insertion sensor unit 816, checking is made whether set-in sensor unit 702 of portable monitor 45D has detected a set-in state. If detected, mode 1 is selected; if not detected, mode 3 is selected. The other blocks are the same as those in the first embodiment, and thus reference marks same as those in FIG. 8 are given to omit their description.

As described above, a wireless communication system according to the present embodiment includes processing units 730 and 810 as a path changing unit changing a reception path for audio information received from a wireless base station. Hence, using portable monitor D and wireless communication system 100 according to the embodiment of the present invention allows a user of information presentation service to receive presented information wherever he or she moves in the aircraft cabin carrying wireless portable monitor D without quality deterioration of the delivered information.

Arrangement of sensor 45S, handset 45H, earphones 45E disposed on a seat is not limited to that of FIG. 2.

INDUSTRIAL APPLICABILITY

The present invention allows a terminal device to be moved beyond the cover area of AP and additionally suppresses interference and disturbance, and thus can be used for a wireless communication system for information distribution service installed in a transportation facility such as an aircraft.

The invention claimed is:

1. An image display device movable between seats, comprising:
    a receiving antenna receiving information while changing a plurality of different wireless base stations;
    a sensor unit for pairing with a destination seat and acquiring a location based on a position of the destination seat which has been paired to;
    a wireless unit selecting one of the plurality of different wireless base stations to be connected based on the location;
    a directivity switching unit changing directivity of the receiving antenna based on the location; and
    a processing unit separating received AV information into video information and audio information, and sending the audio information to the destination seat.

2. The image display device of claim 1, further comprising:
    the sensor unit automatically pairing with the destination seat and acquiring the location.

3. A wireless communication system, comprising:
    an image display device having a receiving antenna receiving information while changing a plurality of different wireless base stations, and movable between seats, including:
        a sensor unit for pairing with a destination seat and acquiring a location based on a position of the destination seat which has been paired to;
        a wireless unit selecting one of the plurality of different wireless base stations to be connected based on the location; and
        a directivity switching unit changing directivity of the receiving antenna based on the location;
        a processing unit separating received AV information into video information and audio information, and sending the audio information to the destination seat; and
    the destination seat including a path changing unit changing a reception path of audio information received from the wireless base station, wherein one of the plurality of different wireless base stations transmits at least one of video information and audio information to the image display device and the destination seat.

4. The wireless communication system of claim 3, comprising:
    the destination seat including an audio output unit;
    a wired transmission line connecting the image display device and an audio output unit of the destination seat; and
    the path changing unit changing a path so as to output the audio information to the audio output unit via the wired transmission line.

5. The wireless communication system of claim 3, wherein the image display device further comprises:
    the sensor unit automatically pairing with the destination seat and acquiring the location.

6. The system of claim 3, wherein the image display device comprises a location compare unit comparing the location with a previous location to determine if the image display device has moved from the previous location.

7. A wireless communication system, comprising:
an access point separating audio-video information into audio information and video information, the access point sending the separated audio information to a first receiving antenna of a destination seat and the separated video information to a second receiving antenna of an image display device; wherein said access point is one of a plurality of access points;
the destination seat including a first sensor for transmitting a position of the destination seat;
the image display device receiving the separated video information while changing a plurality of different wireless base stations, the image display device including:
a second sensor for pairing with the destination seat and acquiring a location based on the position of the destination seat which has been paired to;
a wireless unit selecting one of the plurality of access points to be connected based on the location; and
a directivity switching unit changing directivity of the second receiving antenna based on the location.

8. The system of claim 7, wherein the image display device comprises a location compare unit comparing the location with a previous location to determine if the image display device has moved from the previous location.

* * * * *